Nov. 12, 1929.  J. FIELDING  1,735,384
BRACELET CHAIN
Filed March 2, 1927
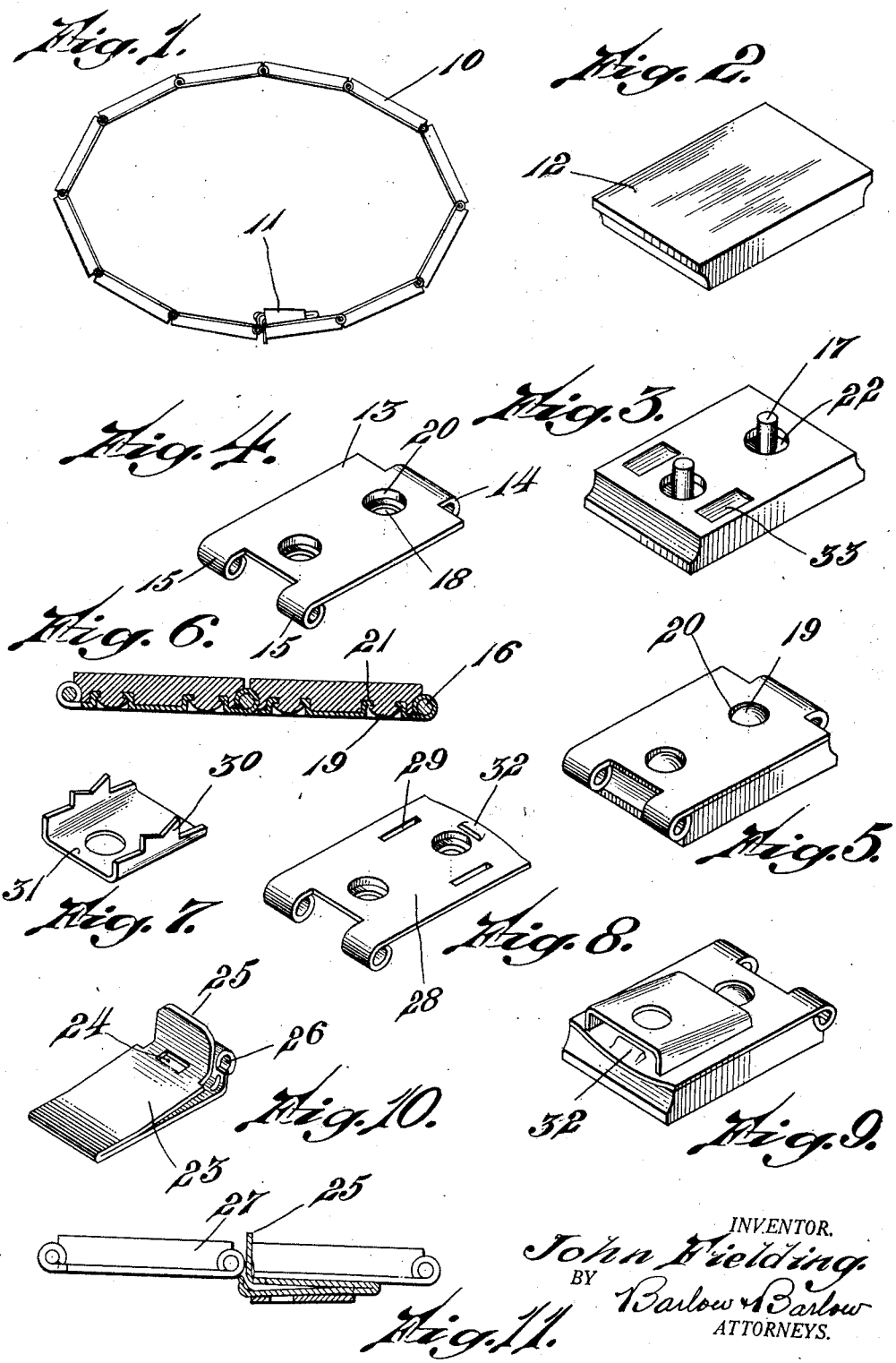
INVENTOR.
John Fielding
BY
Barlow & Barlow
ATTORNEYS.

Patented Nov. 12, 1929

1,735,384

UNITED STATES PATENT OFFICE

JOHN FIELDING, OF NORTH PROVIDENCE, RHODE ISLAND, ASSIGNOR OF ONE-HALF TO JOSEPH P. WHITAKER, OF APPONAUG, RHODE ISLAND

BRACELET CHAIN

Application filed March 2, 1927. Serial No. 171,986.

This invention relates to a bracelet chain comprising a plurality of links, each link having plates, the materials of which are of different hardness; and has for its object to provide a solderless connection for joining the two plates of the chain together.

A further object of the invention is to provide formations on one of the plates to extend through and be riveted over the other of the plates in recesses so that the headed over or rivet portions will not extend beyond the surface of the plate over which they are headed to obstruct smoothness thereof.

A still further object of the invention is to provide a construction the end link of which may be readily formed into one of the cooperating parts for securing the ends of the bracelet together.

With these and other objects in view the invention consists of certain novel features of construction as will be more fully described, and particularly pointed out in the appended claims.

In the accompanying drawings:

Figure 1 is a side elevation of the bracelet.

Figure 2 is a perspective view of the top of the front plate which is formed of a relatively soft material to be easily worked.

Figure 3 is a perspective view of the bottom of the front and back plates assembled to form one of the links of the bracelet.

Figure 4 is a perspective view of the back plate, showing the recesses for receiving the rivet pins.

Figure 5 is a perspective view of the front and back plates assembled, with the rivet pins headed over in the recesses of the back plate.

Figure 6 is a central sectional view showing two of the links of the bracelet attached.

Figure 7 is a perspective view of the pocket-forming member which is attached to the back plate of an end link for receiving the resilient catch on the opposite end of the bracelet.

Figure 8 is a perspective view of the back plate or one of the end links showing the same slotted to receive the finger portions of the pocket-forming member and also provided with a cut and raised portion to engage the detent on the resilient end of the catch.

Figure 9 is a perspective view of the end link of the bracelet with the pocket-forming member attached thereto.

Figure 10 is a perspective view of the resilient catch which is attached to the opposite end of the bracelet to be received in the pocket-forming member shown in Figure 9.

Figure 11 is a side view with the catch portions in section showing the end links of the bracelet as connected together.

It is found in practice very desirable to provide a plurality of links having the top surface of material which is sufficiently soft so that the same may be easily worked into the desired configurations for ornamental appearance for the reception of gems, but such soft material as may be worked in this manner does not have sufficient strength to withstand the strains of connecting the links together thereby necessitating the providing of plates of a relatively harder material for the connecting of the links, but in using such different materials, it is extremely difficult to connect the same by solder as the heat for the soldering operation to connect the softer plate to the harder plate often melts the softer plate unless great care is used or thereby destroying the same to such an extent that the method of connection is impractical. Therefore, in order to obtain the advantageous results of using materials of different degrees of hardness, I have provided a means for connecting the plates together without the use of solder by forming rivet pins on one of the plates and extending them through the other of the plates and heading them over in recessed portions of the plate, whereby the head of the rivet is contained in the recess and does not extend beyond the surface to make the same uneven; and the following is a detailed description of the present embodiment of this invention and showing one means by which these advantageous results may be accomplished:—

With reference to the drawings, 10 designates a plurality of links which are hingedly connected together to form a bracelet, the same being detachably connected by clasp means 11 at their ends. Each of these links comprises a front plate 12 of relatively soft material which may be easily worked and formed into shapes of desired relief for ornamental purposes or into bezel portions for receiving gems and the like, to which is attached for connecting purposes plate 13 of relatively hard material for withstanding the strains of the bracelet which is provided with eyes 14 and 15 on its opposite ends to interlock and receive a pintle 16 for hingedly connecting the plates together.

The front plate is provided with rivet pins 17 extending through the openings 18 in the back plate and headed over as at 19 in the recesses 20 formed in the back plate by deflecting portions of the back plate toward the front plate to form projections 21 on the opposite side of the back plate which are received in recesses 22 in the front plate whereby interlocking connections are formed between the plates of the links to secure them together as will be clearly apparent from the sectional view shown in Figure 6.

In order to secure the end links together by detachable connection, I have provided a resilient catch 23 of well known type having an opening 24, finger piece 25 and hinge eye 26 to connect the same to the end link 27 illustrated in Figure 11. The opposite end link of the bracelet has its back plate 28 slotted as at 29 to receive the finger extending portions 30 of the pocket-forming member 31 which fingers are bent beneath the plate 28 and received in recesses 33 in the front plate to secure the same to the plate 28. A portion 32 is cut and raised on the plate 28 to snap into the recess 24 in the catch 23 to releasably retain the end links in position, it being understood that detachment is accomplished by pressure on the finger piece 25 to disengage the detent 32 from the opening 24.

In forming the front plates of the links, I have provided a recess 33 in all of the links so that any of them may be used as a plate for the end link of the bracelet while any of the back plates of the links may be easily formed to enable them to be utilized as one of the cooperating parts of the end clasp without the necessity of forming new tools for differently formed parts.

It will be seen that I have provided a bracelet composed of links all of which are similarly formed and may be multiplied by machine operations and one by which the parts of different materials may be connected together without the use of solder whereby a bracelet of desired strength may be constructed and yet one in which the top or ornamental part of the bracelet is soft to be easily worked into the desired configurations to enhance its appearance.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a bracelet, a plurality of links, each comprising a rear wear plate having a plurality of openings therein, a solid block of relatively softer material than the rear wear plate, and substantially of the same size, and a plurality of projections on said block secured within said openings to secure the block and wear plate together, said wear plates being pivotally connected.

2. A bracelet chain of a series of hinged together links, each link comprising a back plate having cup-shaped recesses with a pierced bottom wall, a front plate of relatively softer material having rivet pins extending through said bottom wall into said recesses and headed over or enlarged therein whereby to connect the plates together without said pins extending beyond the bottom surface of the back plate.

3. A bracelet chain of a series of hinged together links, each link comprising a back plate and a front plate, the back plate being of sheet stock and having openings therein with portions about said openings deflected to form recesses about said openings on one side and projections about said openings on the other side of said plate, rivet pins extending from the surface of said front plate with recesses in said surface about said pins, said projections on the back plate extending into the recesses on the front plate and the rivet pins extending through said openings and enlarged in the recesses in the back plate to secure the plates together.

In testimony whereof I affix my signature.

JOHN FIELDING.